Dec. 9, 1952    N. C. PRICE    2,620,719
RATE-OF-PRESSURE CHANGE CONTROLS FOR PRESSURE CABINS
Filed June 27, 1938    5 Sheets-Sheet 2
Fig.2
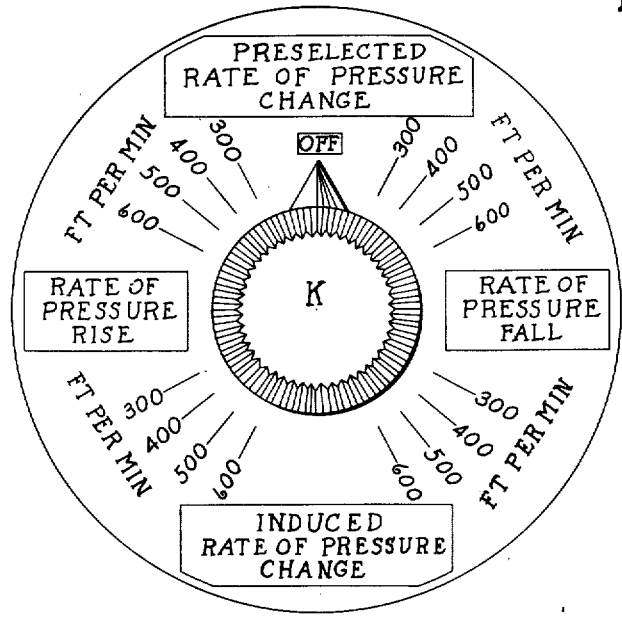
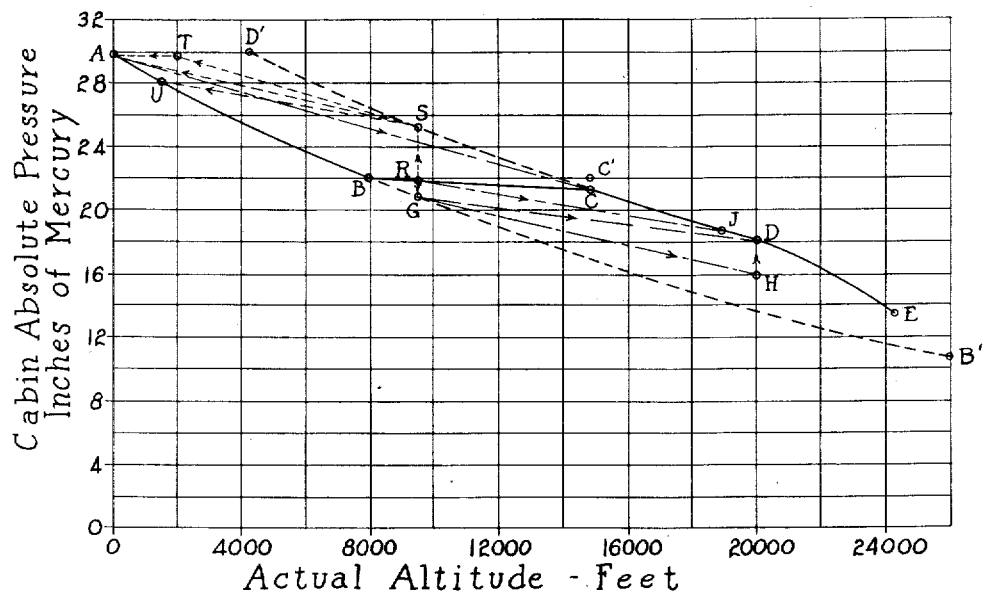
Fig. 3
Inventor
Nathan C. Price Dec. 9, 1952 N. C. PRICE 2,620,719
RATE-OF-PRESSURE CHANGE CONTROLS FOR PRESSURE CABINS
Filed June 27, 1938 5 Sheets-Sheet 3
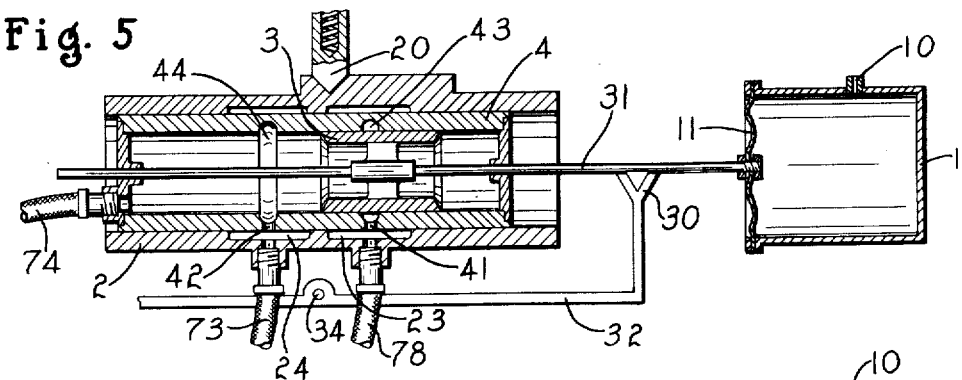
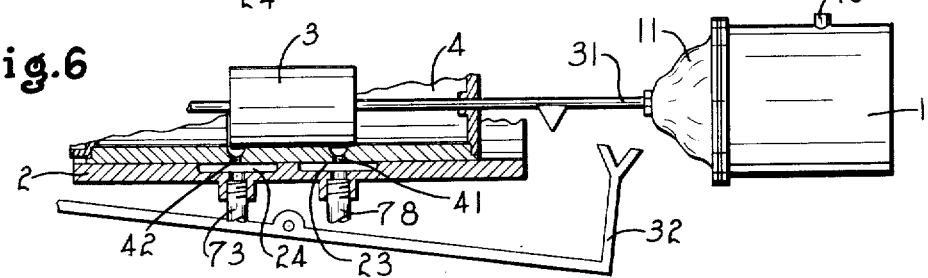
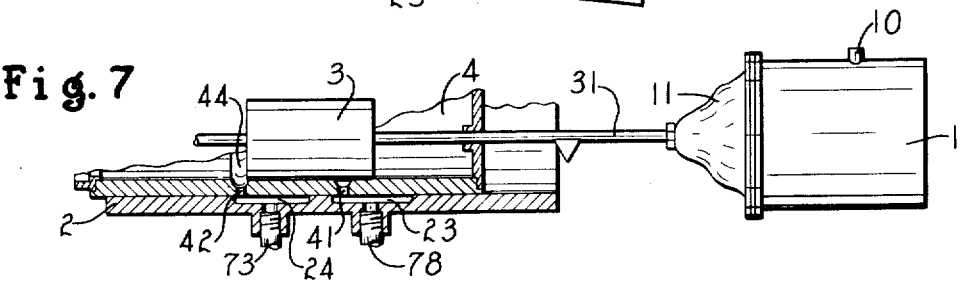
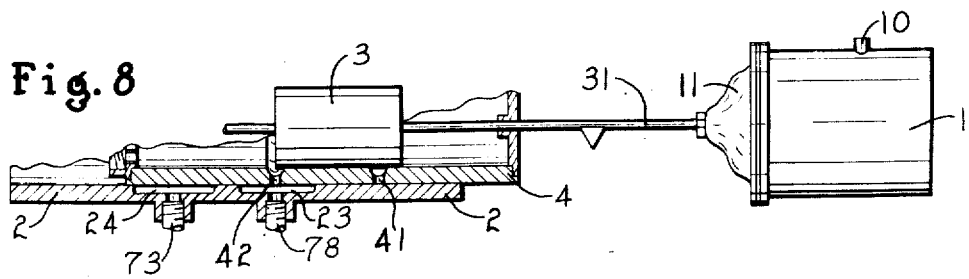
Inventor
Nathan C. Price
By Charles L. Reynolds
Attorney Dec. 9, 1952 N. C. PRICE 2,620,719
RATE-OF-PRESSURE CHANGE CONTROLS FOR PRESSURE CABINS
Filed June 27, 1938 5 Sheets-Sheet 4

Inventor
Nathan C. Price
By
Charles L. Reynolds
Attorney

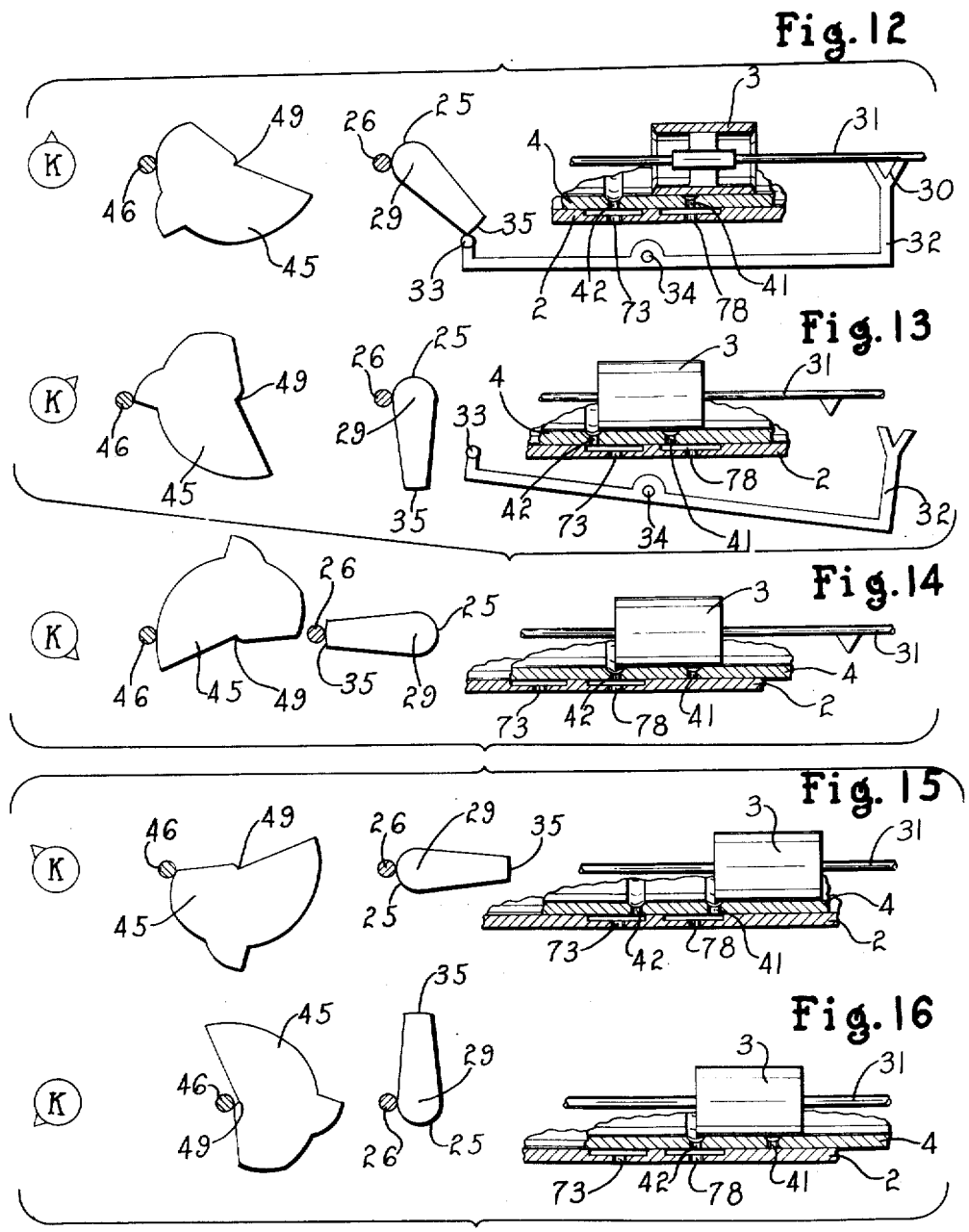

Patented Dec. 9, 1952

2,620,719

UNITED STATES PATENT OFFICE 2,620,719

RATE-OF-PRESSURE CHANGE CONTROLS FOR PRESSURE CABINS

Nathan C. Price, Hollywood, Calif., assignor, by mesne assignments, to Boeing Airplane Company, a corporation of Delaware Application June 27, 1938, Serial No. 216,028

33 Claims. (Cl. 98—1.5)

1

The present invention relates to the same general subject-matter as that of my Patent Re. 22,272, dated February 16, 1943 and in effect constitutes an addition to or an improvement upon the subject-matter of that patent in that herein are disclosed additional or auxiliary controls operable to govern or to limit, at a preselected rate, the rate of rise or fall of the cabin pressure, or when external atmospheric conditions are not such as to cause a change of cabin pressure (as when flying level), to induce such rise or fall, at a preselected rate, yet operating at all times within the upper limits fixed by the basic differential-pressure control of the previous patent, and within the lower limits established by the normal atmospheric pressure curve.

Broadly speaking, then, it is the principal object of the present invention to provide means to control the pressure within the pressure cabin of an aircraft, which between the upper and lower limits mentioned will permit or induce a change of pressure within the cabin, whether rise or fall, at whatever reasonable rate may be desired, and regardless of change or rate of change of external pressure.

It should be noted at this point that, while the controls are required because it is desired to avoid too abrupt changes of pressure, or extremes of pressure plus or minus, on the passengers and crew, the type of controls (recognizing that some control is essential) is chosen in order to avoid overloading the cabin structure, or on the other hand to avoid the necessity of so greatly strengthening the cabin structure as to negative or lessen its value as a load-carrying vehicle.

Illustrations

A few illustrations at this point, illustrated by the pressure-altitude graph, Figure 3, of typical conditions under which the present invention will operate, will make clearer the purpose of the invention. According to the previous invention, still employed herein as the basic control, the pressure within the cabin is controlled in such manner that between sea level or zero elevation and 8,000 feet elevation the pressure within the cabin follows the pressure curve of the outside atmosphere; there is no substantial differential. Between 8,000 feet and, let us say, 15,000 feet the pressure curve within the cabin is substantially level, that is, the pressure at 8,000 feet is maintained with little or no change, though the outside pressure above 8,000 feet is less than the pressure maintained within the cabin. A pressure differential increasing with increase of altitude is thus attained. Then from 15,000 feet up to perhaps 20,000 feet the pressure within the cabin is caused to drop at a rate substantially equal to the rate of atmospheric pressure drop, such as to maintain always a uniform differential of pressure between the inside of the cabin and the outside atmospheric pressure, the differential amounting, for instance, to 2½ pounds per square inch. The pressure within the cabin follows this single line, whether the airplane is ascending or descending, and if the plane was to descend from 20,000 feet to sea level, the pressure within the cabin would be maintained at the 2½ pound differential, no more and no less, down to the 15,000 foot altitude, then would remain substantially constant until the plane reached the 8,000 foot level, and then would closely follow the atmospheric curve from the 8,000 foot level down to sea level, or to any intermediate point.

Let us suppose, however, that the plane is flying level, or is slowly ascending or descending (such that the conditions are substantially the same as in actually level flight), anywhere between 15,000 and 20,000 feet, to cross a mountain range, but that the pilot knows that he is to descend rapidly on the opposite side of the mountains to a landing field at an elevation of 2,000 feet—too rapidly for comfort if the pressure rises at the same rate as the plane's descent from 8,000 feet down. He can calculate the rate of descent for the aircraft that he wishes to maintain, and knowing that rate of descent he may set the controls for the cabin pressure in such a way as to make a substantially uniform rate of pressure rise from his present altitude—perhaps 18,000 feet—to the altitude of the landing field, below 8,000 feet, so that when he commences to descend from his 18,000 foot altitude it is not necessary for the pressure within the cabin to remain constant during the descent from 15,000 to 8,000 feet, and then to rise at the atmospheric rate from 8,000 feet to the level of the landing field; instead the pressure within the cabin increases along a smooth curve which is nearly a straight line from his actual altitude to the altitude of the landing field. Thus the rate of pressure rise is controlled and made substantially constant throughout, and the pressure is not maintained constant for a time and then increased at a more rapid rate than is comfortable, even though such increased rate of pressure rise corresponds exactly with the rate of descent of the aircraft. Similarly, if the pilot is taking off from a field at a low level and must climb rapidly to climb over mountains at a considerable elevation, instead of following the normal zigzag pressure curve he sets or preselects the rate of pressure fall to a selected value, consonant with the rate of ascent of the airplane, and causes the pressure drop within the cabin to proceed along a curve which is nearly a straight line to the maximum altitude to which the plane is expected to rise.

Again, let us assume that the plane is operating between 8,000 and 15,000 feet altitude, and it is shortly to descend to a landing field in the vicinity of sea level. Instead of waiting until the plane commences to descend, and then letting the pressure build up according to the normal or basic controls, the pilot may induce a change of pressure within the cabin, without change of altitude of the airplane, until he reaches the maximum limits fixed by the normal control. He may maintain this increased pressure so long as the plane does not ascend and thereby destroy the pressure difference by the lower external pressure. In the latter case the differential-pressure control would overrule all other controls and force a decrease of cabin pressure sufficient that the maximum differential is not exceeded. If, however, the pilot knows he will soon descend he may then fix a substantially uniform rate of pressure rise within the cabin such that when sea level is reached, or the level of the landing field, the pressure within the cabin and without the cabin will be equalized. On the other hand, he may anticipate a pressure drop resulting from the necessity later to climb rapidly to an altitude above 15,000 feet, from 10,000 feet let us say, (an altitude on the level portion of the normal cabin pressure curve) to 18,000 feet, and he may wish to lower the cabin pressure prior to and during such climb at a somewhat lesser rate of pressure drop than would be accomplished by the normal controls during the contemplated rapid ascent above 15,000 feet, in order to accustom the passengers to the decreased cabin pressure corresponding to the altitude where he is to cruise. He therefore induces a pressure drop within the airplane at a substantially uniform rate less rapid than the normal rate which during such climb would be accomplished by the normal controls, until he reaches a cabin pressure equal to the external pressure, from which point the pressure may drop during ascent directly to the pressure which corresponds to the pressure at the altitude he is finally to attain.

Further objects

It is essential that the pressure within the cabin be never permitted to exceed the external atmospheric pressure by more than a given differential, say 2½ pounds per square inch. The reason for this bears no relation to the comfort or well-being of the passengers, but rather has to do with the structure of the airplane. Without too great an increase in strength and weight of the aircraft structure, the latter can be made to resist such a differential, but if this differential is to be appreciably exceeded, the aircraft structure must be made so much stronger and heavier that the pay load and performance characteristics of the airplane are materially reduced. On the other hand, it is not desirable to permit the pressure within the cabin to be less than the surrounding pressure. The arrangement of the former application prevents pressures exceeding these maximum and minimum limits, but as is now evident, it is a further object of the present invention to provide controls capable of maintaining rates of pressure rise or fall substantially uniform, on the one hand, or on the other hand, capable of inducing rise or fall of pressure within the cabin at a controlled rate, and which will therefore permit control of the pressures within the cabin in any manner and to any extent desired, within the capabilities of the additional controls, but withal subject to the overruling action of the maximum and minimum controls heretofore referred to.

It is a further object to simplify and improve the control mechanism which is the basis of the previous application per se.

It is a further object to provide simple and effective means to accomplish control of the rate of change of pressure, or to induce a change of pressure, in accordance with the principles of the present invention.

Other objects will appear hereafter, and especially such as relate to the more purely mechanical details of the construction.

Drawings

My invention is shown in the accompanying drawings largely in diagrammatic fashion, and the drawings and the constructions and arrangements shown therein are to be understood in the latter sense, but insofar as the principles thereof are concerned, the accompanying drawings show my invention arranged and functioning in a manner such as is at present preferred by me.

Figure 2 is an elevation of the control elements of the preselector, illustrating the various effects that may be obtained, and how simply the controls may be set to obtain these effects.

Figure 3 is a graph, showing various typical and illustrative operations that may be effected by the present invention.

Figure 5 is a sectional view of the preselector, showing the same in position of rest or equilibrium.

Figures 6, 7 and 8 are similar views, showing various relative positions of the parts under conditions obtaining during a pressure fall, that is, during ascent of the airplane, actual or anticipated.

Figures 12, 13, 14, 15 and 16 are in part sectional views through the preselector and in part diagrams, illustrating the manner of connecting the preselector to the control knob shown in Figure 2, and to elements associated with the latter.

Basic control device

Figure 1:
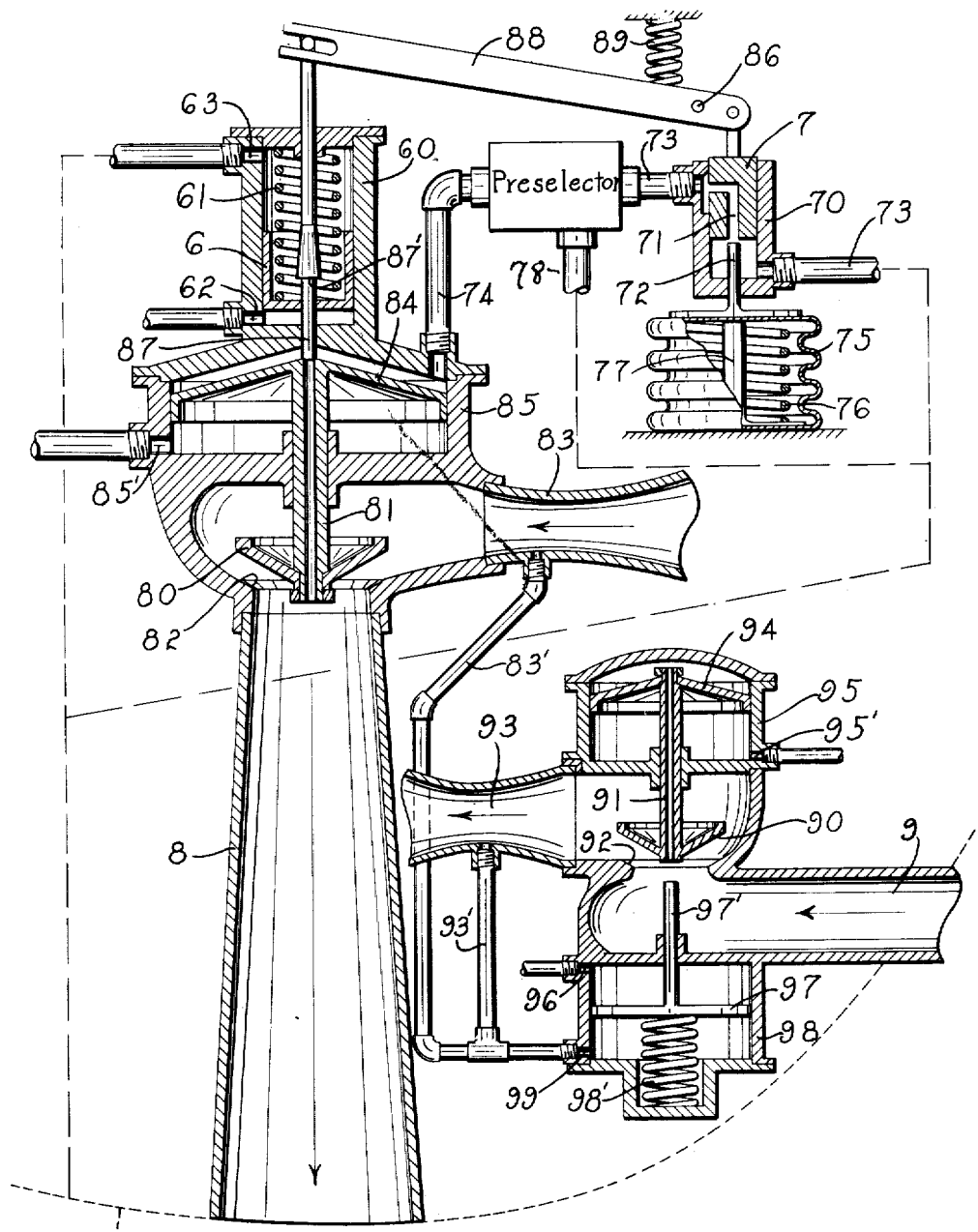
Figure 1 is a sectional view illustrating the relationship of the parts of the control mechanism to each other and to the preselector mechanism, which in itself and in its relation to the basic controls is the particular subject-matter of the present invention.
Figure 4:
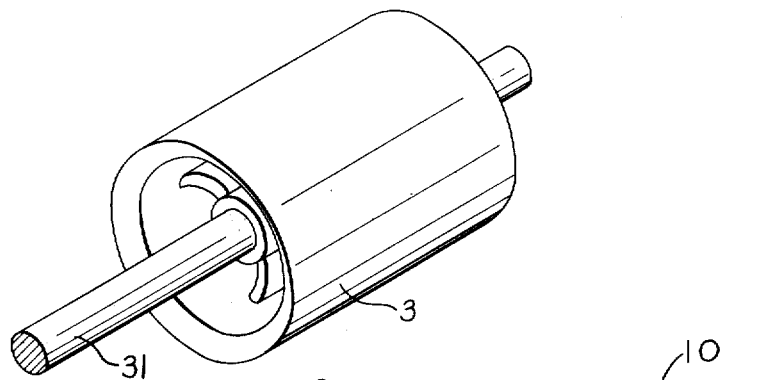
Figure 4 is a perspective view, showing the sleeve valve member of the preselector control.

Figure 1 shows a pressure control device which in its essential respects is similar to that disclosed in the previously filed application, though somewhat modified in arrangement, in part to accommodate the conditions necessary to proper operation of the preselector device, the latter of which is indicated only diagrammatically in this view in its relation to the other parts of the system. Because of the similarity of the arrangement shown in Figure 1 to the previously disclosed device, no extensive description of the same is believed to be necessary, though a brief description of the same follows.

The skin or enclosing wall of the pressure cabin is illustrated at 100. It is supported and strengthened by suitable structure, not shown, and the passenger space within it is sealed against leakage, as is common in pressure cabins. Pressure within this skin is controlled by the control device. Pressure without this skin varies in accordance with external pressure, sometimes called ambient pressure, and approximately inversely in accordance with altitude. Air is admitted to the interior of the cabin from any suitable pressure-producing blower or supercharging device (not shown) through a conduit 9, past a valve 90 having a hollow stem 91, and through a Venturi throat 93. The conduit, and associated parts, constitutes a means to supply air under pressure within the cabin. The valve may seat at 92 to prevent further intake of air into the cabin or to prevent escape of pressure from the interior of the cabin. It is movable, under the influence of a rate of flow control, by an air motor or servo device including a piston 94 movable within a cylinder 95, the space above the piston being capable of communication with supercharger pressure in the inlet conduit 9 through the hollow stem 91, and the space below the piston being in communication with the pressure within the interior of the cabin through the port 95'.

Control of the piston 94, however, is under the influence of a control device consisting of a piston 97 within a cylinder 98, the piston 97 being spring urged by a spring 98' to advance the pin 97' of the piston towards the end of the hollow stem 91 of the valve, thereby tending to close off the hollow stem from communication with the supercharger pressure. Movement of the piston 97 is under the influence of cabin pressure communicating with its upper side through a port 96, and a pressure effect communicating with its lower side through the port 99, the latter pressure effect being made up of a reduced pressure through a tube 93' from the inlet Venturi throat 93 or a reduced pressure through a tube 83' from the outlet Venturi throat 83, both communicating with the port 99, or made up as a combination or differential of such reduced pressure from the two Venturi throats. A valve (not shown) may be employed at the junction of the tubes 83' and 93' to control the reduced pressure at the port 99 under the influence of one or the other of the Venturi throats, but not both, such a valve being illustrated in my above mentioned patent. Its use, however, is not deemed essential in the present arrangement.

Air from the interior of the cabin is discharged through an outlet 8 past a valve 80, capable of seating at 82 to prevent discharge from the interior or to prevent inlet of a higher pressure from the exterior of the cabin, the valve 80 having a hollow stem 81, and the air from the cabin passing through the venturi 83 prior to passing the valve seat 82 and being discharged through the discharge outlet 8. It will be seen that the interior of the hollow stem 81 is in communication at all times with the external atmospheric pressure.

Movement of the valve 80 may be accomplished under the influence of a rate of change of pressure control, incorporating an air motor or servo device, including a piston 84 within a cylinder 85, the piston being connected directly to the hollow stem 81. The space above the piston 84 may be in communication with the external atmospheric pressure through the hollow stem 81 or through a passage 73, 74, hereafter referred to. The space below the piston 84 is in communication with the cabin interior through the port 85'. Since piston 84 fits loosely in cylinder 85 air leaks slowly from the high pressure side past the piston to its low pressure side, whence it is exhausted through conduit 73, 74 to the atmosphere. Movement of the valve 80 and of the piston 84 is under control, directly or indirectly, of two alternatively operable devices, a differential pressure control and an absolute pressure control, either of which may have an influence upon a pin 87 aligned with and capable of closing the hollow bore of the stem 81 and preventing access of external atmospheric pressure through this hollow stem to the space above the piston 84. However, under certain conditions, access of external atmospheric pressure to the space above the piston 84 may still be had through the passage 73, 74. The conditions governing this will appear hereafter.

*Absolute pressure control*

Considering first the absolute pressure control device, the pin 87 may be considered as connected to and movable with a ported plunger 7, movable within a cylinder 70, the port 71 of which is adapted to be opened or closed by recession or approach of a pin 72. The pin 87 need not be directly connected to the plunger 7, and preferably the connection is through a lever 88 fulcrumed at 86 adjacent one end, and with a compression spring 89 acting thereon, tending to urge the pin 87 towards its seat at the end of the hollow bore of the stem 81, and therefore tending to lift the plunger 7 with its hollow bore 71 off the pin 72, which otherwise would close the bore 71. Opening of the bore 71 permits communication through the passage 73, 74 between the exterior atmosphere and the space above the piston 84 to reduce the pressure upon the upper face of such piston, thereby, by the superior pressure applied to the piston's lower face, to raise the piston 84. However, the preselector is interposed between these conduits 73 and 74, and its construction and mode of operation will be described in detail hereafter.

Movement of the pin 72 is under the control of an evacuated Sylphon or bellows 75 placed where it is exteriorly affected by the cabin pressure. A limber spring 76 urges the stem 72 towards the bore 71, and collapse of the bellows 75 beyond a given point is prevented by a stop pin 77.

The function of the absolute pressure control device just described is to prevent appreciable further drop in pressure beyond a given point, and to maintain the pressure within the cabin substantially constant during the reduction in pressure in the surrounding atmosphere accompanying climbing of the aircraft to a higher altitude. In other words, it functions to maintain a substantially constant cabin pressure between 8,000 feet and 15,000 feet. However, the absolute pressure control is overruled by the differential pressure control when a predetermined differential of pressure between the interior cabin pressure and the external pressure has been attained, in order that the structure of the aircraft may not be strained by a pressure differential greater than that for which it is designed.

*Differential pressure control*

The differential pressure control will now be described. A piston 6 is movable within a cylinder 60 in alignment with and surrounding the pin 87. The piston 6 may engage a shoulder 87' on the pin 87 to lift the pin 87 from the end of the hollow stem 81, and the movement of the piston 6 in this direction is resisted at first by the limber compression spring 61, and, after engagement with shoulder 87', also by spring 89 acting on lever 88. The space beneath the piston 6 is in communication with the cabin pressure through the port 62, and the space above it is in communication with the atmosphere through the conduit 63.

Pressure curve

By reference to the graph, Figure 3, the normal atmospheric pressure curve is illustrated at A—B—B'. This is the curve showing the pressure that obtains exteriorly of or surrounding the cabin of an aircraft at any altitude, and unless the aircraft cabin were supercharged, or sealed at ground level so tightly as to prevent escape of any pressure, it is evident that the interior pressure would likewise lie along the curve A—B—B'. This would be uncomfortable, if not physiologically harmful to passengers, yet because of structural and economic limitations it is not possible to maintain the pressure within the cabin at sea level pressure or at any selected constant pressure level for all necessary or feasible flight altitudes, nor indeed is it economical to maintain a pressure within the cabin which exceeds the external pressure by more than a predetermined difference, say 2½ pounds per square inch.

Since it is unnecessary for various reasons to effect supercharging of the cabin at altitudes below 8,000 feet, or some altitude in that vicinity, the actual pressure within the cabin for any given altitude may be substantially equal to the external pressure at such altitude for all altitudes between sea level and 8,000 feet, namely from points A to B of the curve. However, if flight is to be maintained at an altitude between 8,000 feet and, let us say, 15,000 feet, it is desirable and possible to maintain the pressure between these limits of altitude substantially constant, the differential between it and the external pressure varying, and therefore the pressure is indicated by the line B—C. It will be noted that the point C is somewhat below the point C', which is level with B, but this difference of pressure is slight. To build up such differential between cabin and external pressure it is necessary to accomplish closing movement of valve 80 during operation of the absolute-pressure control for constant flow of air through the cabin, and ultimately to place in command the differential-pressure control, after which the opening of the valve remains substantially unchanged for constant flow through the cabin despite further increase in altitude and decrease in atmospheric pressure.

At altitudes above the 15,000 foot altitude which has been selected, it is not practical or economical to maintain a constant pressure, but it is not harmful to permit the pressure to drop somewhat, and therefore the differential pressure control, coming into operation at the point C, serves to maintain the acquired differential of cabin pressure over external pressure, and the pressure curve follows the line C—D, parallel to the line B—B'. The point D is shown as corresponding to the 20,000 foot elevation. At this point it may be assumed that the characteristics of the particular blower or supercharger being employed to supply air through the passage 9 are such that its limit has been reached, and it can no longer maintain the predetermined differential. If the aircraft proceeds to a higher elevation, the internal pressure will tend increasingly to approach the external pressure. In other words, the cabin pressure curve will follow the line D—E.

Operation of basic controls

Now referring to Figure 1, and disregarding the portion of the pressure curve between A and B, wherein the rate of flow control operates, it will be understood that when the point B is reached the Sylphon 75, which heretofore has been held collapsed by the cabin pressure (approximately equal to the ambient atmospheric pressure) to which it is subjected, begins to expand, the spring 76 being set or adjusted to effect expansion at this point. The pin 72 closes or tend to close the port 71, partially cutting off communication through the passage 73, 74 with the space above the piston 84. The onrush of air past the valve 80 at all times tends to draw this valve downward to its seat, and to draw the connected piston 84 downward. Up to now (below 8,000 feet) the Sylphon 75 has been collapsed, and the space above the piston 84 has been in communication with reduced atmospheric pressures through 73, 71, and 74, thereby tending to balance the outflow's downward tendency, and, with the resistance of cabin pressure, acting beneath the piston 84, to downward movement, the piston and valve 80 are held in their upper position, with the valve open. Now, however, the expansion of the Sylphon 75 has reduced the pressure differential acting to hold the valve up, as described. The action of outflowing air on the valve now tends to close it, since the balancing force through 73, 71, 74 is interrupted and in part destroyed. Nor can this balancing force be restored at this time through the hollow stem 81, for the pin 87 follows downward movement of the piston 84, under the influence of spring 89, and prevents access of reduced external pressure to the space above the piston through the alternative passage formed by the hollow stem 81. Closure of the valve therefore proceeds slowly and regularly, in accordance with change of external pressure, and at a rate (coupled with control of inflow, described hereafter) to maintain a substantially constant pressure within the cabin, by reason of the fact that if the piston moves downward too rapidly or abruptly (the pin 87 necessarily following), the plunger 7 will be raised off the pin 72, again opening the bore 71, and restoring the balancing relatively reduced pressure above the piston 84, through 73, 71, and 74, which tends to raise the piston. The pin 72 tends to follow up and close the receding bore 71, but at a relatively slow or almost negligible rate, which corresponds to the increase in apparent altitude within the cabin, represented by the distance C'—C.

Theory of operation of preselector

It is important to note here that closure or opening of the valve 80 controls the cabin pressure and hence its differential over external pressure; the valve's rate of closure during ascent of the airplane, or its rate of opening during descent of the airplane, determining the rate of increase or decrease of the differential of cabin pressure over the external pressure; hence the rate of fall or rise of cabin pressure, is dependent upon the closing or opening of the passage 73, 74. Also, it is important to note that rise or fall of cabin pressure may be induced by closure or opening of the valve 80, under conditions which, of themselves, will not effect a change in the cabin pressure—as during level flight, without change of the airplane's altitude, usually but not necessarily between the points B and C; even when the airplane's altitude is changing, a rise or fall of the cabin pressure may be induced at a rate independent of—if desired, more rapidly than would naturally be caused by—the actual change in altitude. Rise or fall of cabin pressure, then, may be induced by closure or opening of the valve 80, which in turn may be induced by closure or opening, arbitrarily, of the passage 73, 74. This is the basis of operation of the preselector, as will appear hereafter.

*Operation of basic controls,* Continued

Progressive closure of the valve 80, accomplished and controlled as described above, tends to reduce the rate of flow through the venturi 83, and in turn through the control piston 91 effects corresponding opening movement of the valve 90, the controls operating in such a manner, and as explained in greater detail in my previously mentioned patent, as to maintain the cabin pressure from B to C substantially constant. The pressure is not maintained absolutely constant, however, for a difference of pressure between C' and C is required in order to bring the differential-pressure control into operation at the point C, but not at the level C', which corresponds to the level B, and in order to secure proper maintenance of nearly constant pressure, as has been made clear above.

At the point C the differential-pressure control is brought into operation, overruling the absolute-pressure control, and thereafter, for increase in altitude, maintaining the cabin pressure at a constant differential above the external atmospheric pressure. Thus at the point C the pressure in the space above the piston 6 has decreased, due to decrease in the external atmospheric pressure, while the pressure in the external atmospheric pressure, while the pressure in the space beneath the piston 6 has remained substantially constant, being in communication with the cabin pressure. The differential thus built up at this point overcomes the limber spring 61, which may be adjusted to regulate the point of initiation of differential pressure control, and the piston 6 rises, or tends to rise, and eventually the piston 6 engages the shoulder 87' and lifts or tends to lift the pin 87 from its closure of the hollow stem 81. The pressure differential between the bottom and top of the piston 6 in addition overcomes the resistance of the spring 89 as well as that of the spring 76.

The tendency of the pin 87 to rise from the hollow bore of stem 81 tends to decrease the pressure above the piston 84, whereas the pressure beneath it is substantially the same as it was immediately prior to lifting of the pin. The piston 84 therefore tends to rise and to lift the valve 80 farther from its seat 82, and thus to increase the rate of outflow of air from the interior of the cabin, thereby decreasing the pressure within the cabin, but controlling the rate of decrease so that the cabin pressure remains always at the predetermined differential above the external pressure. Change in the rate of outflow through the venturi 83 tends to affect the position of the valve 90 correspondingly, so that the rate of inflow of replacement air is controlled in accordance with the rate of outflow to maintain the predetermined pressure differential within the cabin, as is described more fully in my previously mentioned patent. This condition holds until the point D is reached, and would be maintained farther if the blower were of sufficient capacity to supply the required pressure, but since the limit of its capacity may be assumed to be reached at D, the pressure within the cabin falls from the point D to E at a greater rate than the pressure decreases along the line B—B'.

All the above, other than the possibility of affecting the rate of change of pressure by opening or closing passage 73, 74, is disclosed in substance in my previous patent, but is necessary to a clear understanding of the additional subject-matter constituting the present invention. Consequently it will be evident that the constructions and arrangements disclosed in such patent, or any equivalents thereof, may be substituted for those described and shown in the present application. It will also be apparent that the specifically different basic control herein disclosed may be used, per se, in substitution for that of the previous application, even without the added auxiliary controls.

*Possible uses of preselector*

Now let us assume that the pilot is taking off from a field at or near sea level, and that he is going to climb steadily to an altitude somewhere above 15,000 feet. It is possible to anticipate that the pressure control devices will operate within the portion of the graph between points C and D. Since it is desirable to control the rate of pressure rise or fall, and usually to maintain such rate at a minimum, or at least, to maintain such rate as uniform throughout as may be, it is possible to set the preselector controls, to be described hereafter, in such a way as to cause the line of pressure drop to by-pass the point B, and to proceed directly from the point A (or from any intermediate point, as U) directly to the point C at 15,000 feet. If the final elevation is higher than this, at a point beyond the point C and along the line D—D', the controls may be set to reduce the cabin pressure at a substantially constant rate to a point on the line B—C, and then the selector may be reset to continue substantially the same rate of pressure decrease to the point on line C—D corresponding to the final altitude to be attained. By so doing the rate of pressure fall is maintained a minimum, and the ultimate pressure is attained most directly and uniformly, and the effect on the passenger is thereby made the least abrupt. Again, in descending, if the pilot is flying at an elevation between 15,000 and 24,000 feet, and knows that he must shortly descend rapidly to a landing field at zero elevation or at some elevation between A and B, for instance at the level U, he may set his preselector control at such a substantially constant rate of pressure rise as will by-pass the point C, thereby making the rate of pressure rise less abrupt, and therefore less noticeable upon the passengers. When a point on the line B—C is reached he may reset the control to induce substantially the same rate of pressure increase from such point to the point A or U corresponding to the elevation of the landing field.

On the other hand, assuming that the plane is to take off from a landing field at the elevation A, and is to ascend to an elevation between 8,000 and 15,000 feet, namely, along the flat portion of the pressure curve B—C, the pilot may wish to decrease the pressure at a lower rate than if the line from A to the final elevation point on A—B were followed, and he may set the preselector to follow the curve A—S, so that when he reaches the altitude at which is is to fly, let us say 9,500 feet, which would be represented by the point R on the curve B—C, he has a pressure within the cabin which is higher than the pressure which would be attained if the curve A—B—R were followed, but, while the aircraft is cruising in level flight at the attained altitude of 9,500 feet, the pressure will continue to decrease from the point S to the point R at substantially the same rate, or the pilot may alter such rate to whatever rate he wishes, and the effect is thereby less noticeable to the passengers. The same technique may be applied equally well if the final elevation is below 8000 feet, the rate of pressure decrease being less than that represented by the line A—B. Again, in descending from flight at the level R, he may prefer to anticipate a descent and to increase the pressure slowly within the cabin while still maintaining level flight, and he therefore operates the preselector in such a way as to induce or build up the pressure within the cabin from R to S, and then when the descent occurs the increase of pressure from S to A may be at the same rate, less abrupt than the change in external pressure, and therefore less noticeable to the passengers. The landing field may indeed be at the level corresponding to the point U on the curve A—B, and the rate of pressure rise therefore may be even less rapid, while accomplishing the lesser pressure change in substantially the same time interval, as indicated by the line S—U. On the other hand, the pilot, intending to increase the pressure to correspond to the point A, may set his preselector at a rate which will complete the required pressure rise before the aircraft has reached the altitude of the landing field, such as at the 2000 foot level corresponding to the point T, and the passengers may thus become accustomed to such pressure, which corresponds to the point A, during the latter part of the descent as well as the landing, in preparation for disembarkation. He might increase the pressure even beyond the pressure of the point A, and then come down to the point A, or, at the point T, knowing that the interior pressure then equals the final exterior pressure, he may so operate the preselector as to maintain that pressure until the level A is reached, at which point the interior and exterior are placed in free communication.

Again, flying at a level corresponding to the point R, with the normal controls in operation, and being confronted with the necessity of climbing over a barrier, he may set his preselector in such a way as to decrease the pressure from the point R to a point such as J on the curve C—D by a substantially constant rate of pressure fall while the aircraft climbs from 9,500 feet to 19,000 feet at a speed causing a higher rate of external pressure drop, thus by-passing or short-cutting the point C, and he may do the same in reverse when he is descending from the point J to a level corresponding to the point R. Again, instead of increasing directly from the point R to the point J, he may prefer to induce the pressure drop from the point R to the actual atmospheric pressure at the same altitude, represented by the point G, while maintaining level flight, and then from the point G as the aircraft ascends the rate of pressure fall may be such as to by-pass the point C and to attain instead the point D, as indicated by the line G—D. If the calculated rate of pressure fall or the setting of the selector is not quite accurate, so that instead of attaining the pressure D at the altitude which corresponds to D the cabin pressure becomes H at this altitude, the pilot, having attained the desired altitude, may set the preselector to induce the pressure to rise along the vertical line H—D at a slow rate, while maintaining level flight at the 20,000 foot altitude.

*Limiting effect of basic controls*

In all the above it will be observed that the pressure within the cabin in no case decreases below the external atmospheric pressure, because obviously this is impossible even during a descent as long as replacement air is being supplied to the cabin unless means are provided for evacuating the interior of the cabin. On the other hand, none of these pressures exceeds the selected limit of 2½ pounds differential over and above the atmospheric pressure line. Of course, all the figures used in the above illustrations are arbitrary, and if the structure is intended to withstand a higher differential of pressure, then the selected differential or pressure limit, whatever that limit may be, is not exceeded, because as that differential pressure limit is attained, the differential pressure control, notwithstanding the preselector, will overrule the preselector and insure that the predetermined differential is not exceeded. This is a safety measure and prevents the imposition of undue stresses upon the structure. However, anywhere between the atmospheric pressure curve A—B—B' and the differential pressure curve E—D—D', by the employment of the preselector controls and the proper setting thereof the pressure within the cabin may be controlled to attain any pressure desired, or to increase or decrease, that is, to rise or fall, at any rate desired, and within the limitations of the preselector device. Also it will be noted that between these limits, even when flying along the flat portion B—C of the curve, a pressure rise or fall may be induced, and at a selected rate, by proper operation of the preselector. Thus in Figure 2 the preselector control, represented by the knob K, may operate during descent from a point along line D—C or ascent from a point along line A—B to give a preselected rate of pressure change, either rise or fall as the case may be, by moving it to the upper left or to the upper right, respectively, from the position shown in Figure 2, or during operation in level flight, along the portion B—C of the curve, or in ascending or descending from a point on such line, a desired rate of pressure change, either rise or fall, may be induced by moving the preselector control knob K either to the lower left or lower right, respectively.

*Structure and arrangement of preselector*

Having now explained the various operations possible with the preselector in combination with the pressure control device, it will be apparent that the preselector may operate in various ways, and its construction and mode of operation will be made clear by reference to a particular form and arrangement, by way of illustration, although there may be substituted for this particular construction and mode of operation others which are equivalents, and which will readily suggest themselves to one skilled in this art, once this form is understood.

The basis of the preselector control is a pressure-change-responsive element, such as the hollow chamber 1 having the bleed port 10 of carefully predetermined size admitting to its interior from the aircraft cabin, and having a flexible wall 11, which moves inwardly if the pressure outside the chamber 1, which is the cabin pressure, rises more rapidly than the interior pressure within the vessel 1 may be equalized by flow through the bleed port 10, and which flexes outwardly if the rate of cabin pressure fall exteriorly of such chamber is more rapid than can be equalized through the bleed port 10. Such devices are employed in rate-of-climb indicators used in airplanes. Such a device is shown in position of equilibrium in Figure 5, which it assumes as long as the cabin pressure remains constant, whatever such pressure may be, or changes at a very slow rate, as is also the remainder of the preselector device. While the flexible wall or diaphragm 11 is shown as directly connected to other devices which, in the form illustrated, require appreciable movement, it is to be understood that the showing in this manner is purely for purposes of illustration, and that suitable relay devices would or could be employed to multiply the movement of the diaphragm as applied to the controlled device or element.

The preselector, as previously pointed out, is interposed between the passages 73 and 74, by which atmospheric pressure is admitted above the piston 84, and preferably between the space within the cylinder 85 above the piston 84 and the bore 71, which, with the pin 72, controls the access of such atmospheric pressure above the piston 84. The preselector comprises in part a sleeve 4, which is axially slidable by suitable control, and to an end of which is connected one of the two connections 73 and 74, as for instance the connection 74. The connection 73 is made to a sleeve 2 which is slidable lengthwise of the sleeve 4, actuated by a suitable control. A circumferential groove 24 in the inner wall of the sleeve 2 communicates with the passage 73, and with a port 42 admitting to a circumferential groove 44 within the inner wall of the sleeve 4, whereby, when the several ports and passages are in the position of Figure 5, which is a neutral position, or a position of rest, free and full communication is afforded between the passages 73 and 74, as though the preselector were not interposed between them.

There is a further line connected to the preselector, the line 78, which connects to the atmosphere surrounding the pressure cabin, and this line communicates, in certain positions of the parts, with the interior of the sleeve 4 through the circumferential groove 23 and the port 41 and groove 43, or, in another position of the parts, through the port 42 and associated parts. In the position of parts shown in Figure 5, however, communication between the interior of the sleeve 4 and the atmospheric line 78 is cut off by a sleeve 3, which is slidable within the sleeve 4, being controlled for such movement by the rod 31 which is secured to or movable under the influence of the flexible wall 11 of the pressure change responsive element 1. Parts may be locked in the neutral position or position of rest shown in Figure 5 by the respective locks 20 and 30, the lock 20 engaging the shiftable sleeve 2, and the lock 30 engaging the shiftable rod 31. The lock 30 is releasable upon rocking a lever 32, fulcrumed at 34, and having an operating element 33 at its opposite end (see Figure 12). The lock 20 is released by analogous means which will be described hereafter. When these locks are released it is evident that the respective sleeves 2 and 3 are slidable lengthwise of the sleeve 4. The sleeve 2 is slidable under the influence of manual control means, thereby to induce a change in the conditions prevailing, whereas the sleeve 3 is shiftable automatically under the influence of the pressure change responsive element 1. The latter sleeve 3, then, controls conditions automatically in accordance with the rate of change of pressure, whether rise or fall. The sleeve 4 is also manually slidable, under conditions and by means hereafter explained. Each of the three sleeves is, therefore, slidable relative to each of the others.

It will be understood that the space within the cylinder 85, above the piston 84, is connected with the external atmosphere through the connection 74, 73, and would be so connected were the preselector not employed; at least this connection would be made whenever permitted by the relative positions of the bore 71 and pin 72. If we now assume that communication of the port 42 with the passage 73 is cut off, and instead is established with the passage 78, port 41 being completely closed, it will be evident that the effect is to bypass the passage 71, and to avoid any control effect of the pin 72. Again, should the port 42 be partly but not completely cut off (the port 41 remaining closed), communication between the passages 73 and 74 will be restricted. If the communication through the restricted port 42 is less free than is communication through the passage 71, the control then shifts from the passage 71 and pin 72 to the restricted port 42. Whichever of these restrictions is momentarily the greater is the one which controls to the greater extent. Further, if we consider that the port 42 is shifted to communicate only with the passage 78, bypassing the passage 71 and port 41 being closed, but that the port 42 is restrictedly—not freely—open, then it will be evident that while the control afforded by the pin 72 and passage 71 is completely eliminated, there is still an effective control through the restricted port 42.

Going back to the case where the port 42 in communication with passage 73 is not completely cut off, but is restricted, and the port 41 is completely closed, it has been made clear that control may be effected either by the restriction of the port 42 or by the restriction of the passage 71 by the pin 72. Either one may be effective depending upon conditions, and this condition, this setting of parts, shown in Figure 6, is responsive to ascent at a given rate of climb, manifested in the attempt to lower the cabin pressure at the same rate, and the effort of the pressure change responsive element 1 to control the rate of change of cabin pressure so that it will not exceed a given rate, this regardless of or superimposed upon the control effected through the pin 72 and passage 71.

Thus, referring to Figure 6, it will be seen that all parts are in the position of Figure 5, except that, there being an excess of pressure within the element 1 over the cabin pressure, caused by a rapid decrease in the latter, the airplane must be ascending into a region of lower pressure at a rate faster than the pressure within the interior of the element 1 may be dissipated through the bleed opening 10, such as along line A—B. The rod 31 having been released, the sleeve 3 has been automatically shifted to the left, though all other parts of the preselector are in the position of Figure 5. In the position thus shown in Figure 6, in an exaggerated fashion, the passage 78 and its port 41 are still cut off from communication with the interior of the sleeve 4 by the sleeve 3, but the left-hand end of the sleeve 3 has been shifted to the left sufficiently that it materially restricts the port 42 and communication between the passage 73 and the passage 74 (not shown in this or succeeding figures). The result is that, regardless of the position of the pin 72 with respect to the passage 71, the communication between passages 73 and 74 is restricted, and if the rate of climb increases it becomes even more restricted. From this it follows that the cabin pressure, acting on the lower side of piston 84, normally balanced against the air force tending to close the valve 80 and assisted by the reduced pressure above the piston 84, now is unable to resist as strongly the tendency to close the valve 80, with the result that valve 80 tends to close, thereby restricting outflow from the cabin and limiting the rate of pressure fall to a low rate, such as represented by the line A—S.

If a higher rate of pressure fall is desired, for example as indicated by line A—C, under approximately the same conditions, this may be obtained by more greatly opening the port 42, and this may conveniently be accomplished by manually shifting the sleeve 4 to the left. Such shifted position of the sleeve 4 is shown in Figure 7, and it has the effect of further opening the port 42, and of requiring the sleeve 3 to move even farther to the left under the influence of even greater distention of the flexible wall 11, at a greater rate of climb, in order to close the port 42. Nevertheless the port 42 is still open, the port 41 is still closed, and the position of parts thus shown in Figure 7 limits the rate of pressure fall to some extent, depending upon the degree of movement of the sleeve 4, but permits a higher rate of pressure fall than the position of parts shown in Figure 6.

If, now, while the airplane is in level flight, or even while climbing slowly, we desire to effect a pressure fall in anticipation of climbing to a greater altitude, such as along line R—G, but desire to limit the induced rate of pressure fall to a low rate, or if I wish to effect a steady fall along line R—J, for example, instead of maintaining the pressure constant to C and having it then drop rapidly, this may be accomplished by shifting the sleeve 2 to the left, so that it completely cuts off the passage 73 and moves its port 23 into position to register with the port 42. Now the passage 71 and its stem 72 is completely bypassed, and control of the pressure change rate is afforded by reason of the position of the sleeve 3 relative to the port 42. The port 41 is completely out of action in this position of the parts. Figure 8 shows this position with the flexible wall distended by a pressure fall, and thereby accomplishing shifting of the sleeve 3 to the left to effect a control by restriction of the passage 42, controlling communication between the atmospheric passage 78 and the passage 74.

Figure 9:
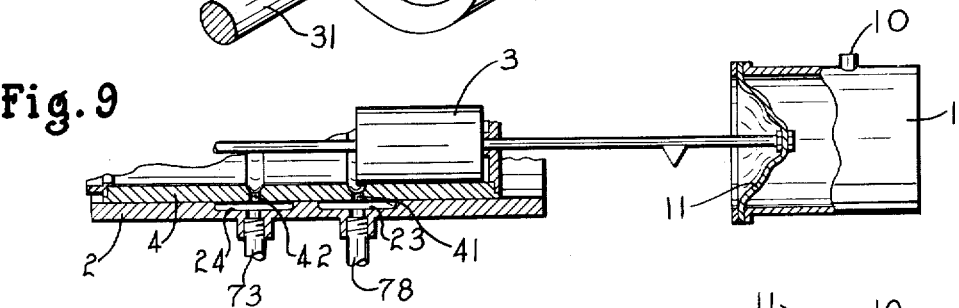
Figures 9, 10 and 11 are similar views showing conditions obtaining during a pressure rise, that is, during descent of the airplane.

If now we go to Figure 9 we see parts in a position they would occupy during opposite conditions, that is, during a pressure rise, when the airplane is descending in the region represented by line D—C—R, for example. The flexible wall 11 is distended inwardly, as shown in Figure 9, indicating that the pressure is rising at a rate more rapid than can be relieved through the bleed opening 10, and consequently the wall 11 is flexed inwardly and has shifted the sleeve 3 to the right. The sleeves 2 and 4 are unchanged in position from Figure 5, but the shifting of the sleeve 3 has been sufficient to open the port 41, partially at least, so that not only may surrounding atmospheric pressure, lower than cabin pressure, be communicated to the space above the piston 84 through hollow stem 81 and the passage 73, 74, but additional access is afforded through the partly opened port 41 from passage 78, and this regardless of the position of pin 87 or the pressure responsive element 75 and the pin 72 and its passage 71. With parts in this position the rate of pressure rise is limited to a reasonably low rate, as indicated by line D—G—R.

Figure 10:
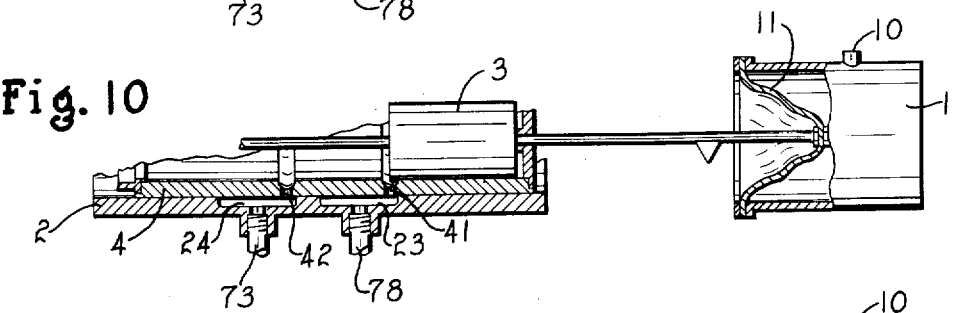

When a higher rate of pressure rise is to be permitted, such as along line J—R, this may be accomplished by manually shifting the sleeve 4 to the right, making it necessary for the sleeve 3 to shift even farther, and consequently requiring even greater deflection of the wall 11 before the port 41 is opened to effect a greater tendency to open the valve 80. This position of parts is shown in Figure 10. Again, if the airplane is descending below the point B and it is desired to increase the pressure steadily along line C—A, for example; or if the airplane is in level flight, or is slowly descending or even while it is ascending to surmount an obstacle, and it is desired to induce a pressure rise, such as from R to S, and then to increase the pressure along line S—U or S—A, the sleeve 4 is manually moved even further to the right, to the position shown in Figure 11, where port 24 is completely cut off and the port 42 is in registry with the passage 78. Now the absolute pressure responsive element 75 is inoperative by reason of the passage 73 having been blocked, and the control is altogether under the influence of the preselector, except as the differential control may override it, and the position of the valve 80 is governed by the width of opening of the port 42, to allow communication between the atmospheric line 78 and the passage 74.

*Control of preselector*

The parts are controlled by a knob K, with which or in accordance with the movement of which are movable suitable elements to control or to effect a change in the positions of the sleeves 2, 3 and 4. The particular means to accomplish this are quite immaterial, but are shown herein as consisting of a cam 25 with its follower 26 to control the sleeve 2, a cam 35 with its follower 33 to control principally the sleeve 3, and the cam 45 and its follower 46 to control the sleeve 4. These cams and elements are shown in various positions in Figures 12 to 16 inclusive. In these figures it should be understood that the centers 29 of the cams 25 and 35, 49 of the cam 45, and the center of the knob K are coaxial, and for convenience are or may be secured upon a single shaft, so that all the cams and the knob turn together. They have been shown displaced laterally in the figures for convenience of comparison of their different positions.

The position of parts shown in Figure 12 corresponds to neutral position or position of rest of Figure 5. The lock at 30 is held secure by the engagement between the cam follower 33 and the cam 35. The lock 20 (Figure 5) may be considered locked by the position of the follower 26 relative to the cam 25, though the connections for so doing are not shown. The sleeve 4 is likewise held fixedly in position by the position of the follower 46 relative to its cam 45.

In Figure 13 the knob has been shifted or rotated, to point to the upper right, to control a pressure fall, occurring by reason of the plane's ascending so that the external pressure drops along line A—B, at a certain lesser, preselected rate of change. The position of the knob K will be understood by reference to Figure 2. This action has released the lock 30, has shifted the sleeve 4 by reason of displacement of the cam follower 46, but the sleeve 2 is still locked in position. This position of the parts corresponds to Figure 7.

In Figure 14 the knob K has been turned to the lower right to induce a rate of pressure fall at a preselected rate, when such change would not otherwise occur because the plane either maintains level flight, or is climbing between 8000 feet and 15,000 feet, so that the absolute pressure control mechanism tends to maintain substantially constant pressure as represented by line B—C. Here the sleeves 2, 3, and 4 are all released, and the sleeves 2 and 4 have been shifted manually to the left. This corresponds to the position of parts shown in Figure 8. In this figure the cam 35 has engaged the cam follower 26.

In Figure 15 the sleeve 4 is in its neutral position, but the sleeve 2 has been shifted manually to the left, the sleeve 3 being released. This corresponds to the position of parts shown in Figure 10, and the knob K in this position of the parts has been shifted to upper left to effect increase of pressure at a preselected rate.

Figure 11:
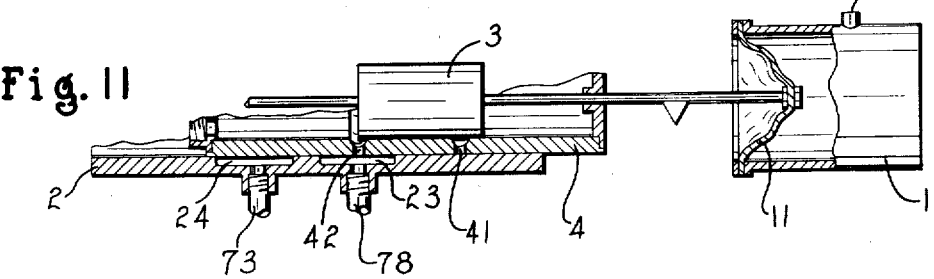

In Figure 16 the sleeve 4 has been shifted manually farther to the right, the sleeve 2 being in its neutral position, and parts are now in the position of Figure 11, with the knob K shifted to the lower left, whereby, although the airplane is flying level, an increase in cabin pressure is induced at a certain rate, depending upon the setting of the knob. Similarly control of the rise of pressure during a steep descent, such as along line C—A or S—A is thus afforded.

*General*

The present invention is preferably auxiliary to the arrangement disclosed in my Patent Re. 22,272 and reference is made to that patent for a clearer understanding and disclosure of the supercharging system as a whole. It is to be understood that the disclosures of that patent may be imported into this application, if needed to a fuller understanding of the present invention.

The preselector has been described as operating under the control of a chamber 1 of fixed capacity, that is, not adjustable, and having a bleed port 10 of fixed capacity, not adjustable, and therefore acting upon a flexible wall 11 of fixed and non-variable flexibility. Changes in these factors, then, need not be considered as affecting the operation of the preselector since the control element may be so chosen and constructed that these factors are fixed and not variable. The variable, then, is the amount of shifting of the sleeve 3, due to the known flexibility of the flexible wall. However, it will be evident that the factors normally considered as fixed and unvarying, as mentioned herein, may be made variable, and the control may be effected by the variation of one or more of these factors normally considered unvarying. The operation of the invention has been described, by way of illustration, as dependent on the flexing of the non-varying flexible wall, but the principles thereof may be equally realized by altering one or more of these other factors, and such a change is to be considered as within the general scope of my invention.

It is believed that the operation of the present invention has been made clear as this description has progressed, and that it is only necessary to point out that by the means shown or equivalent means (and those shown are purely diagrammatic), the rate of change of pressure in such a system may be controlled as desired, either for rise or fall, or if the airplane is maintaining actual, approximate, or simulated level flight (the latter between points B and C) a pressure change may be induced, whether rise or fall, and at a selected rate. By coordinating the rate with the altitude of the airplane and the actual rate of ascent or descent which is to follow, or which is being performed, or even quite independently of the actual rate, the pressure within the cabin may be brought into correspondence with the desired pressure which it is intended should prevail at the intended altitude, most directly and with the least noticeable change, when the airplane finally does attain the altitude intended.

What I claim as my invention is:

1. Mechanism to control aircraft cabin air pressures comprising, in combination with means to supply air under pressure to the cabin, a valve operable to control flow of air through the cabin, differential-pressure responsive means operable at all altitudes to actuate said valve to prevent the cabin pressure exceeding a selected pressure above the external pressure, absolute-pressure responsive means operable automatically at a selected altitude to actuate said valve to maintain cabin pressures substantially constant, up to the limit of differential pressure set by the differential-pressure responsive means, and means operable at will, and overriding the absolute-pressure responsive means, but subject to the control of the differential-pressure responsive means, selectively to actuate said valve to effect a change in cabin pressure, or to control the rate of change of cabin pressure.

2. Mechanism to control aircraft cabin air pressures, comprising, in combination with means to supply air under pressure to the cabin, a valve operable to control flow of air through the cabin, a normal automatic control system including an absolute-pressure responsive means automatically operable at a selected altitude to actuate said valve to initiate an increase of cabin pressure relative to external pressure, and a differential-pressure responsive means automatically operable at all altitudes to actuate said valve to prevent increase of cabin pressure beyond a selected differential over external pressure, and therefore at a given altitude imposing a maximum limit on the increase initiated by the absolute-pressure responsive means, and controlling cabin pressures at altitudes above such given altitude, and further in combination therewith a manual control system including means to override at will the absolute-pressure responsive means and to actuate said valve to initiate a change of cabin pressure, whether rise or fall, independently of altitude, but arranged to be limited by the differential-pressure responsive means, whereby the differential limit set by the latter is never exceeded by the manual control system nor by the automatic control system.

3. Mechanism to control aircraft cabin pressures, comprising, in combination with means to supply air under pressure to the cabin, and an outlet to discharge air from the cabin, valve means operable to control air movement through and pressure within the cabin, means operable automatically, and primarily under the influence of cabin outflow pressure, to operate said valve means to maintain a substantially constant cabin pressure, differential-pressure responsive means operable automatically at all times upon the attainment of a selected differential of cabin pressure above external pressure to operate said valve means for limiting such differential to the selected value, and means manually operable at all times to operate said valve means to decrease outflow and thereby to increase cabin pressure above such substantially constant value, or to increase outflow and thereby to decrease cabin pressure below such substantially constant value, between a lower limit fixed by the external pressure, and an upper limit fixed by said differential-pressure responsive means, and at a selected rate of pressure increase or decrease, as the case may be.

4. In combination with an aircraft body adapted to be sealed against escape of pressure from within, under the influence of a pressure differential above the ambient pressure at altitudes, means to supply air under pressure within the cabin, and a valve controlling outflow from the cabin, thus to attain a pressure differential within it, pneumatic servo means to move said valve and arranged for operation under the opposed influences of cabin outflow movement, tending to close it, and of an air pressure differential, tending to open it, means normally and automatically varying the relationship of the several air forces acting upon said servo means to maintain a substantially constant pressure within the cabin, and means manually operable at will to override the normally and automatically operable means, and to vary the relationship of the several forces acting upon the servo means independently of such automatic means, thereby to control the rate of closure or opening of the outflow valve, and consequently the rate of rise or fall of cabin pressure.

5. In combination with an aircraft body adapted to be sealed against escape of pressure from within, means to supply air under pressure within the cabin, a valve controlling outflow from the cabin and therefore the pressure therein, automatic normal means to operate the valve, including a cylinder and piston operatively connected to the valve, a conduit connecting one chamber of the cylinder, at one side of the piston, to the external atmosphere, the parts being arranged to tend to open the valve when said conduit is open, and to close the valve when such conduit is closed, and said valve-operating means including also a pressure-responsive device automatically operable to control opening and closing of the conduit in accordance with pressure changes due to change of altitude, a by-pass conduit by-passing said pressure-responsive device, and a manually operable means in the by-pass conduit operable to regulate communication between the cylinder's chamber and the external atmosphere, and thereby to superimpose a control upon said piston, auxiliary to said pressure-responsive device.

6. The combination defined in claim 5, and means operable automatically in response to change of cabin air pressure to govern said auxiliary control to limit the rate of change of cabin air pressure to a predetermined value.

7. In combination with an aircraft body adapted to be sealed against escape of pressure from within, under the influence of a pressure difference above the ambient pressure at altitudes, means to supply air under pressure within the cabin, absolute-pressure responsive means controlling the pressure within the cabin as a function, in part, of the external pressure, and including a control element, a conduit connecting the latter to the external atmosphere, and a normal control valve movable under the combined influence of cabin pressure and external pressure to regulate communication through the conduit to the control element, and thereby to maintain constant pressure within the cabin regardless of external pressure, a by-pass conduit connecting the control element and the external atmosphere, and by-passing said normal control valve, and auxiliary control valve means manually operable to regulate communication through the by-pass conduit, and thus to govern the cabin pressure independently of the normal control valve, and in accordance with the setting of the auxiliary control valve means.

8. In combination with an aircraft pressure cabin, means to supply air under pressure within the cabin, a valve operable to regulate outflow from the cabin, and subject to substantially constant impact flow, tending to close it, an absolute-pressure control operatively connected to said valve, and operable to overrule such impact flow and to effect closing movement of the valve with increase of altitude, and vice versa, and thereby normally to create such a difference of pressure within the cabin over the external pressure as to maintain the cabin pressure substantially constant, a rate-of-pressure-change-responsive element operatively connected to said valve to overrule said absolute pressure control, and to regulate automatically the closing or opening of the valve, and thereby the rate of pressure change within the cabin independently of change of external pressure, and a differential-pressure control operatively connected to said valve to overrule each of the previously-mentioned controls therefor, and to limit the pressure differential between the cabin pressure and the external pressure.

9. In combination with an aircraft pressure cabin structure having a known resistance to bursting under the influence of a higher pressure internally than externally, means to supply air under pressure within the cabin, means operable to control and produce a pressure differential of cabin pressure over external pressure, a rate-of-pressure-change control to govern the action of the pressure controlling means, and thereby to govern the rate of pressure change within the cabin, regardless of change or rate of change of external pressure, and a differential-pressure control operatively connected to overrule the rate-of-change control, regardless of the absolute value of the external pressure, thereby to limit the pressure difference possible of attainment to a safe value within the bursting strength of the cabin structure.

10. A rate-of-pressure-change control mechanism for an aircraft pressure cabin, comprising a rate-of-pressure-change member movable in response to change in cabin pressure, a conduit connected at one end to the atmosphere, pressure control means operatively connected to the other end of said conduit, a cylinder and a surrounding sleeve interposed in said conduit, the cylinder and the sleeve each having therein a port normally in registry with each other and affording flow through said conduit, a sleeve within the cylinder shiftable by movement of said rate-of-pressure-change member to increase or decrease restriction of such cylinder port, and manual means to shift the cylinder for changing the amount of cylinder port restriction effected by a given movement of said inner sleeve.

11. Control mechanism for an aircraft pressure cabin, comprising a cylinder having a port therein, a sleeve surrounding said cylinder and having two ports therein, an atmospheric line connected to one such port in the sleeve and a second atmospheric line connected to the other sleeve port, a conduit leading from the cylinder, a pressure-controlling device operatively connected to the latter conduit, a normal control interposed in the first atmospheric line, and manual means shiftable to place the cylinder port in registry with one or the other of the ports of the two atmospheric lines, thereby to control their communication through the conduit leading from the cylinder with the pressure-controlling device.

12. A rate-of-pressure-change control mechanism for an aircraft pressure cabin, comprising a rate-of-pressure-change member movable in response to change in cabin pressure, a cylinder having two spaced ports and lines connected thereto, both of which are connected to the atmosphere, a conduit leading from the cylinder, a pressure-controlling device operatively connected to the latter conduit, a normal control interposed in one atmospheric line, a valve member shiftable relative to the two cylinder ports, and operatively connected to be moved by said rate-of-pressure-change member to cover or uncover the ports of the two atmospheric lines, thereby to control their communication, quantitatively and selectively, through the conduit leading from the cylinder with the pressure-controlling device to control the rate of change of cabin pressure.

13. The rate-of-pressure-change control mechanism defined in claim 12 and manual means to shift the cylinder, relatively to the normal path of movement of the valve member, thereby to adjust and vary at will the relationship of the valve member to the cylinder's ports, to control the rate of change of cabin pressure at any desired rate.

14. Mechanism to control aircraft cabin pressure, comprising, in combination with means to supply air under pressure to the cabin, a valve operable to control discharge of air from the cabin, three pressure responsive means operable to actuate said valve, one whereof is sensitive to the pressure differential of cabin air pressure over external pressure, and always operable to prevent such differential exceeding a selected value, the second means being operable to regulate cabin air pressure within the differential thus determined, and the third means being sensitive to rate of pressure change and operable to restrict any change of cabin air pressure, within the predetermined differential, automatically to a predetermined rate, independently of the rate of air supply to or discharge from the cabin or the actual difference between cabin air pressure and external pressure or the rate of change of such difference.

15. An aircraft, including a pressure-tight cabin, capable of change of altitude at various rates, either ascending or descending, thereby by change of altitude tending to change the relation of cabin pressure to external pressure, means to supply air under pressure to said cabin and to discharge air therefrom, thereby tending to change the relation of cabin pressure to external pressure, valve means to govern airflow through the cabin, and consequently pressure within the cabin, means responsive to the difference of cabin pressure over external pressure, normally operable upon said valve means to govern the rate of pressure change within the cabin in accordance primarily with rate of change of external pressure due to change of altitude, and always operable upon said valve means to prevent cabin pressure exceeding a predetermined differential over external pressure, and means sensitive to rate of change of cabin pressure, operatively connected to said differential-pressure responsive means, to modify its normal operation, and thence to said valve means, selectively to effect a change in cabin pressure at a preselected rate, or to control the rate of change of cabin pressure at a preselected rate different from and independently of the rate otherwise determined by change of altitude.

16. An aircraft, including a pressure-tight cabin, capable of change of altitude at various rates, either ascending or descending, thereby by change of altitude tending to change the relation of cabin pressure to external pressure, means to supply air under pressure to said cabin and to discharge air therefrom, thereby tending to change the relation of cabin pressure to external pressure, a valve to govern airflow through the cabin, and consequently pressure within the cabin, means responsive to the difference of cabin pressure over external pressure, normally operable upon said valve to govern the rate of pressure change within the cabin in accordance primarily with rate of change of external pressure due to change of altitude, and always operable upon said valve to prevent cabin air pressure exceeding a predetermined differential over external pressure, means sensitive to rate of change of cabin pressure, also operatively connected to said valve, to modify the operation of the valve normally effected in response to the operation of the differential-pressure responsive means, said differential-pressure responsive means being operable to effect change of cabin pressure with change of altitude at a rate not exceeding a preselected rate determined by said rate-of-change responsive means, and means operable to effect change of cabin pressure without change of altitude at a preselected rate likewise determined by said rate-of-change responsive means, but said differential-pressure responsive means being operative at all times to prevent the cabin pressure, regardless of the rate of its change, from increasing to a value such that the predetermined differential of cabin pressure over external pressure would be exceeded.

17. A cabin pressure control adapted to provide an adjustable positive pressure therein, comprising a supply of air under pressure, an outlet valve operable to control the pressure built up by said supply of air, a servo-vacuum system for operating said outlet valve, and pressure rate sensitive and altitude sensitive valves in said servo-vacuum system for varying the same to control said outlet valve and means operative to produce a change in the altitude setting of the outflow valve that will be approached at the rate corresponding to the pressure rate sensitive valve.

18. A cabin pressure control adapted to provide an adjustable positive pressure therein, comprising a supply of air under pressure, an outlet valve operable to control the pressure built up by said supply of air, a servo-vacuum system for operating said outlet valve, and pressure rate sensitive and altitude sensitive valves in series in said servo-vacuum system for varying the same to control said outlet valve and means operable to produce a change in the altitude setting of the outflow valve that will be approached at the rate corresponding to the pressure rate sensitive valve.

19. Mechanism for controlling change of pressure within an aircraft cabin, comprising a valve for controlling the flow of air through such cabin, pneumatic operating means for said valve actuated by the pressure differential between a relatively high pressure region and a relatively low pressure region, means establishing communication between such low pressure region and the external atmosphere, and means responsive to rapid changes of pressure within the aircraft cabin operating automatically to regulate communication through said communication establishing means between said low pressure region and the external atmosphere to govern the rate of pressure change in the cabin effected by movement of said valve.

20. The mechanism defined in claim 19, and means adjustable to regulate the rapid pressure change responsive means to vary the effect thereof on the communication establishing means to govern the rate of pressure change in the cabin effected by movement of said valve.

21. The mechanism defined in claim 19, and manual means settable to select the amount of regulation exercised by the rapid pressure change responsive means on the pneumatic operating means, thereby to establish a desired limiting rate of pressure change in the cabin.

22. The mechanism defined in claim 19, and means establishing communication between the cabin interior and the relatively high pressure region to supply air from the cabin to such high pressure region.

23. Aircraft cabin pressure control mechanism comprising an outflow valve, differential pressure means operable to move said outflow valve tending to maintain substantially a predetermined constant pressure differential between cabin pressure and atmospheric pressure throughout a given altitude range, and rate-of-pressure-change means sensitive to the change in air pressure in the cabin and operable to override said differential pressure control means and to move said valve toward open position from the position thereof said differential pressure means tends to establish, to reduce the rate of increase in cabin air pressure below a predetermined value during descent of the aircraft within such predetermined range.

24. In a cabin supercharging system, a source of air under pressure, and means for controlling the cabin pressure comprising an outlet valve, a fluid motor for operating said outlet valve in response to variation in the differential pressure between the cabin and the atmosphere, a control means for said motor comprising a piston spring loaded on one side and exposed to cabin pressure on the other side, the piston being moved against the action of the spring by a fluid connection thereto, and a passageway controlled by said control means connecting a fluid connection to said fluid motor when said piston moves relative to said fluid motor whereby to cause the motor to follow the movement of said piston.

25. In mechanism for controlling the pressure in an enclosure: valve means for controlling flow through an enclosure opening; pneumatic means for positioning said valve means; a pneumatic line for controlling the operation of said pneumatic means; absolute pressure responsive means controlling a valve in said pneumatic line; and means operative upon a predetermined rate-of-change of enclosure pressure to connect another pneumatic line to said pneumatic means.

26. In mechanism for controlling the pressure in an enclosure: valve means for controlling flow through an enclosure opening; pneumatic means for positioning said valve means; a pneumatic line for controlling the operation of said pneumatic means; absolute pressure responsive means controlling a valve in said pneumatic line; and rate-of-change means responsive to enclosure pressure controlling another valve in said pneumatic line.

27. In mechanism for controlling the pressure in an enclosure: valve means for controlling flow through an enclosure opening; pneumatic means for positioning said valve means; pressure responsive means responsive to air pressure in the enclosure for controlling said pneumatic means; and rate-of-change means sensitive to change of air pressure in the enclosure and operable to to modify the control of said pressure responsive means over said pneumatic means upon change of pressure in the enclosure at a rate in excess of a predetermined value.

28. Mechanism for regulating the pressure within an aircraft body for high altitude flights, and adapted to be sealed at high or medium altitudes against escape of pressure from within, under the influence of a pressure differential above the ambient pressure at such altitudes, comprising fluid operator means operable to create such a pressure differential between the cabin and atmosphere, a rate-of-pressure-change element responsive to change of air pressure within the cabin, means operable at will, in anticipation of a change in altitude, and a consequent change in cabin pressure, to effect a fluid pressure change in said fluid operator means and thereby to induce a change in cabin pressure for altering such pressure differential, independently of the rate of change of the ambient pressure, due to change or lack of change of altitude, and means controlled by said rate-of-pressure-change element for governing said inducing means to limit the rate of change of pressure within the cabin during such inducing operation.

29. Mechanism for controlling change of pressure within an aircraft cabin, comprising fluid operator means operable to create a pressure differential between the cabin air pressure and atmosphere, pressure-responsive means operable to change the fluid pressure in said fluid operator means to effect a change of cabin air pressure from atmosphere, and thereby to establish a pressure differential between the air pressure within the cabin and atmospheric pressure, and a rate-of-pressure-change element responsive to rapid change of air pressure within the cabin, operatively connected to said fluid operator means, and, upon such rapid rate of cabin air pressure change, operable to retard the rate at which the pressure in said fluid operator means changes without interrupting such change, thereby to limit the rate of air pressure change within the cabin.

30. Mechanism for controlling change of pressure within an aircraft cabin, comprising valve means operable to effect a change of cabin pressure, and thereby to establish a pressure differential between the pressure within the cabin and atmospheric pressure, fluid operator means operable to move said valve means, and a rate-of-pressure-change sensitive means operable automatically during descent of the aircraft at a rate sufficient to produce an undesirably rapid increase in cabin air pressure to effect a fluid pressure change in said fluid operator to open said valve means for increasing the outflow of air from the cabin and thereby reducing the rate of pressure increase in the cabin.

31. Aircraft cabin pressure control mechanism comprising an outflow valve, valve operating means operatively connected to said outflow valve, control means normally operable to actuate said valve operating means to hold said outflow valve open during ascent of the aircraft, and rate-of-pressure-change means operable to override said control means and to actuate said valve operating means to effect movement of said valve toward closed position upon decrease of pressure in the aircraft cabin at a rate in excess of a predetermined rate, said control means being further operable to reassume control over said valve operating means when ascent of the airplane at such excessively rapid rate ceases and to actuate said valve operating means to move said valve toward open position.

32. Aircraft cabin pressure control mechanism comprising an outflow valve, valve operating means operatively connected to said outflow valve, pressure control means operable to actuate said valve operating means to effect closing movement of said valve tending to produce a predetermined differential of cabin air pressure over atmospheric pressure, rate-of-pressure-change control means sensitive to increase in cabin air pressure at a rate in excess of a predetermined rate during descent of the aircraft, and energizing means for said valve operating means operable by said rate-of-pressure change means to override said pressure control means and to actuate said valve operating means to effect opening movement of said valve to reduce the rate of air pressure increase in the cabin below that necessary to maintain the predetermined differential of cabin air pressure over atmospheric pressure.

33. Aircraft cabin pressure control mechanism as defined in claim 32, and maximum differential pressure control mechanism operable to override said rate-of-pressure-change means and to actuate the same valve operating means to open the valve sufficiently to prevent the differential of cabin air pressure over atmospheric pressure exceeding a predetermined value by closing movement of the outflow valve.

NATHAN C. PRICE.

REFERENCES CITED

The following references are of record in the file of this patent:

UNITED STATES PATENTS

| Number | Name | Date |
|---|---|---|
| Re. 22,272 | Price | Feb. 16, 1943 |
| 1,407,293 | Mott | Feb. 21, 1922 |
| 1,511,489 | Armstrong | Oct. 14, 1924 |
| 1,562,663 | Strong | Nov. 24, 1925 |
| 1,972,190 | Gregg | Sept. 4, 1934 |
| 2,002,057 | Gregg | May 21, 1935 |
| 2,549,690 | Klemperer | Apr. 17, 1951 |

FOREIGN PATENTS

| Number | Country | Date |
|---|---|---|
| 149,709 | Great Britain | Aug. 17, 1920 |
| 679,386 | France | Jan. 9, 1930 |

UNITED STATES PATENT OFFICE
CERTIFICATE OF CORRECTION

Patent No. 2,620,719                      December 9, 1952

Nathan C. Price

It is hereby certified that error appears in the above numbered patent requiring correction and that the said Letters Patent should read as corrected below.

Column 26, line 7, for the claim reference numeral "32" read -- 31 --.

Signed and sealed this 16th day of January 1962.

(SEAL)
Attest:

ERNEST W. SWIDER
Attesting Officer

DAVID L. LADD
Commissioner of Patents